United States Patent [19]

Lange

[11] Patent Number: 5,773,910
[45] Date of Patent: Jun. 30, 1998

[54] TRANSVERSE FLUX MACHINE

[75] Inventor: Andreas Lange, Heidenheim, Germany

[73] Assignee: Voith Turbo GmbH & Co., Heidenheim, Germany

[21] Appl. No.: 555,127

[22] Filed: Nov. 8, 1995

[30] Foreign Application Priority Data

Nov. 10, 1994 [DE] Germany .......................... 44 40 166.3

[51] Int. Cl.⁶ ................................................. H02K 21/14
[52] U.S. Cl. ............................ 310/266; 310/90; 310/156; 310/163
[58] Field of Search ................................... 310/266, 156, 310/163, 90

[56] References Cited

U.S. PATENT DOCUMENTS

| 4,982,128 | 1/1991 | McDonald | 310/156 |
| 5,051,641 | 9/1991 | Weh | 310/163 |
| 5,204,570 | 4/1993 | Gerfast | 310/156 |

FOREIGN PATENT DOCUMENTS

| 1 120 573 | 12/1961 | Germany . |
| 1 120573 | 12/1961 | Germany . |
| 37 05 089 | 8/1988 | Germany . |
| 40 27 041 | 8/1991 | Germany . |
| 9116192.4 | 10/1991 | Germany . |
| 91 16 192.4 | 5/1992 | Germany . |

*Primary Examiner*—Thomas M. Dougherty
*Assistant Examiner*—Timothy A. Williams
*Attorney, Agent, or Firm*—Marshall, O'Toole, Gerstein, Murray & Borun

[57] ABSTRACT

A transverse flux machine includes an outer stator having a plurality of soft iron outer stator elements and an outer ring winding; an inner stator having a plurality of soft iron inner stator elements and an inner ring winding; and a rotor having a plurality of soft iron rotor elements and a plurality of rotor magnets, the rotor elements positioned in alternating relationship with the rotor magnets when viewed with respect to a plane perpendicular to an axis of the transverse flux machine. Also with respect to this plane, the rotor magnets, the inner stator elements, and the outer stator elements each have a width. The width of the rotor magnets narrows in a direction toward the inner stator. Also, the width of the inner stator elements is smaller than the width of the of the outer stator elements.

2 Claims, 3 Drawing Sheets

PRIOR ART

TRANSVERSE FLUX MACHINE

BACKGROUND OF THE INVENTION

1. Field of the Invention

The invention relates to alternators and in particular to a transverse flux machine having an outer stator with a plurality of soft iron elements and a ring winding, an inner stator with a plurality of soft iron elements and a ring winding, and a rotor having a plurality of soft iron elements alternating with magnets.

2. Description of Related Technology

Transverse flux machines having an outer stator with a plurality of soft iron elements and a ring winding, an inner stator with a plurality of soft iron elements and a ring winding, and a rotor having a plurality of soft iron elements alternating with magnets are known in the art. For example, reference is made herein to DE 37 05 089 C2 (corresponding to Weh, U.S. Pat. No. 5,051,641) and FIGS. 1a and 1b.

Known advantages of transverse flux machines include, for example, the high energy density which is achieved chiefly by a design with two air gaps. One air gap lies radially outside and the other radially inside a rotor of the machine. The two air gaps are connected magnetically in series.

With reference to FIGS. 1a and 1b, a rotor R of a prior art transverse flux machine is designed as a cylindrical ring. Therefore, with respect to a front view thereof, soft iron elements 2 and magnets 3 of the rotor alternate so that a magnet 3 is always neighbored by two soft iron elements 2 and vice versa. The rotor typically includes two such rings with a plastic ring between them.

The transverse flux machine of the prior art shown in FIGS. 1a and 1b includes stators, that is, an outer stator, generally $S_1$, constructed of a number of soft iron elements 1a and a ring winding 4, and an inner stator, generally $S_2$, constructed of a number of soft iron elements 1b, and a ring winding 5. The soft iron elements 1a and 1b are horseshoe-shaped as shown in FIG. 1b. The free legs of the horseshoes face the two rings of magnets 3 and soft iron 2 of the rotor R.

The magnets 3 of the rotor R are small, plane-parallel plates known for use in transverse flux machines. Looking at the rotor magnets 3 with respect to a planar section perpendicular to the axis of the transverse flux machine (see FIG. 1b), the two boundary surfaces of each small magnet plate 3 are thus parallel to one another. Accordingly, the soft iron elements 2 between the magnets must be wedge-shaped.

If small transverse flux machines with a small number of poles are utilized, the curvature of the rotor and stators is very high (or the radius of curvature very small). The soft iron elements 1a of the outer stator and the soft iron elements 1b of the inner stator, again looking with respect to a cross-section of the machine perpendicular to the axis thereof, are of equal width (shown by a double-arrow b). In the case of the inner stator, the soft iron elements 1b are very close to one another, while in the case of the outer stator, there is a larger distance between the soft iron elements 1a. As a result, the flux density in the inner air gap is higher than in the outer air gap. This is disadvantageous because different magnetic utilizations result from such disparity in the inner and outer air gaps. The machine is thus not utilized optimally.

SUMMARY OF THE INVENTION

It is an object of the invention to overcome one or more of the problems described above.

It is also an object to the invention to provide a transverse flux machine having an outer stator with a plurality of soft iron elements and a ring winding, an inner stator with a plurality of soft iron elements and a ring winding, and a rotor having a plurality of soft iron elements alternating with rotor magnets which result in optimal magnetic utilization.

A transverse flux machine according to the invention includes: an outer stator having a plurality of soft iron outer stator elements and an outer ring winding; an inner stator having a plurality of soft iron inner stator elements and an inner ring winding; and a rotor having a plurality of soft iron inner rotor elements and a plurality of rotor magnets, the rotor elements positioned in alternating relationship with the rotor magnets when viewed with respect to a plane perpendicular to an axis of the transverse flux machine. Also with respect to this plane, the rotor magnets, the inner stator elements, and the outer stator elements each have a width. The width of the rotor magnets narrows in a direction toward the inner stator. Also, the width of the inner stator elements is smaller than the width of the of the outer stator elements.

Other objects and advantages of the invention will be apparent to those skilled in the art from the following detailed description taken in conjunction with the drawings and the appended claims.

BRIEF DESCRIPTION OF THE DRAWING

FIG. 1b is a cross-sectional view taken along the line 1B—1B of FIG. 1a.

FIG. 2b is a cross-sectional view taken along the line 2B—2B of FIG. 2a.

FIG. 3b is a cross-sectional view taken along the line 3B—3B of FIG. 3a.

DETAILED DESCRIPTION OF THE INVENTION

With respect to the invention, the inventor recognized flux density can be equalized in a radial inner air gap and in a radial outer air gap of a double air gap alternator, by making the magnets of a rotor (which is disposed between an outer stator and an inner stator) narrow in width with reference to a direction from an outside toward an inside of the alternator (i.e., the width of the magnets get smaller in a direction toward the inner stator). This narrowing of the rotor magnets can be step-wise, for example, as in a stepped pyramid. However, the narrowing of the rotor magnets can also be continuous. It is also conceivable to narrow the width of the magnets from the outside toward the inside, so that there is both an abrupt change and a continuous narrowing on a part of the radial extent of the rotor magnet.

Figure 1A:
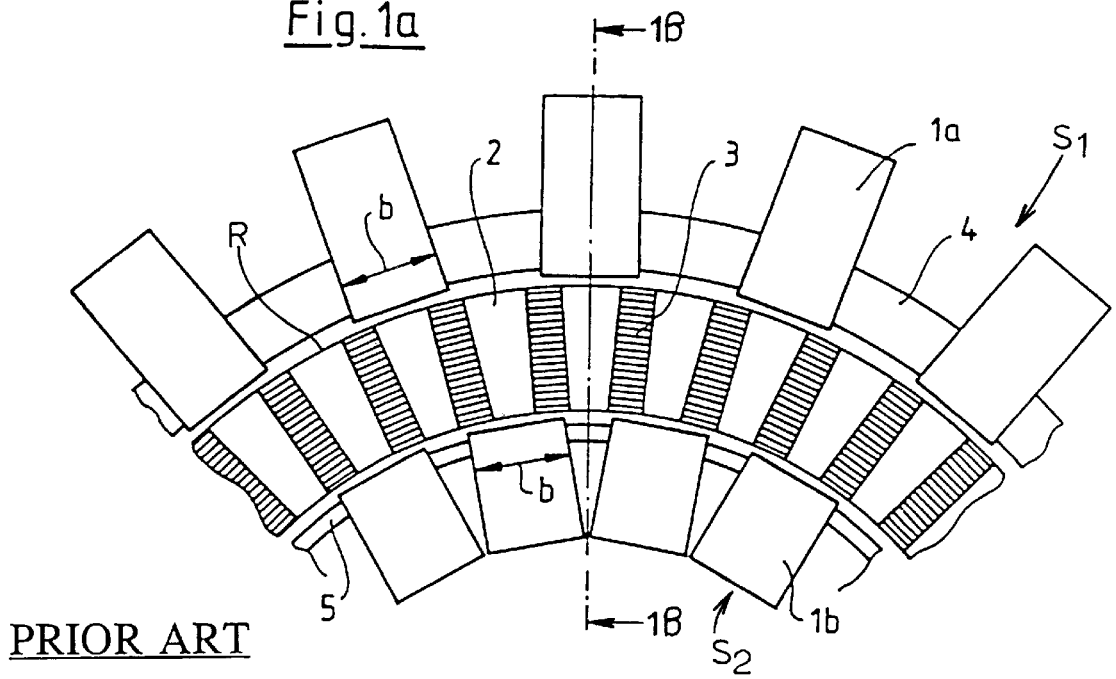
FIG. 1a is a partial sectional view of a transverse flux machine according to the prior art, the section shown being perpendicular to an axis of the machine.
Figure 1B:
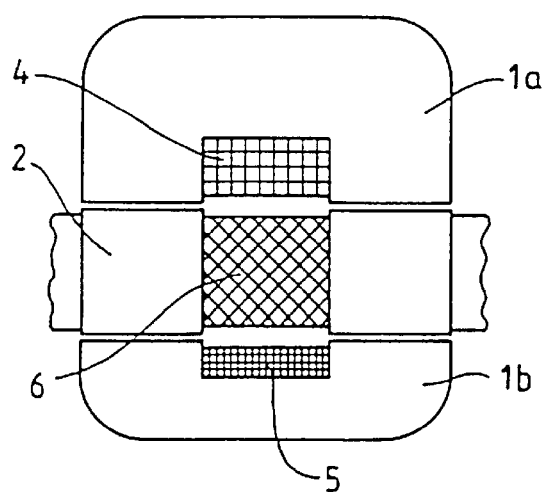

The invention is explained in more detail with the aid of the drawings. As disclosed herein with respect to the background of the invention, FIG. 1a shows a partial view of a transverse flux machine according to the prior art. The section of the machine shown in FIG. 1a is perpendicular to an axis of the machine. FIG. 1b is a cross-section through the object of FIG. 1a, in a cutting plane 1B—1B. As already disclosed herein, the transverse flux machine shown in FIGS. 1a and 1b include a rotor R, having soft iron elements 2, magnets 3, and a plastic ring 6, disposed between an outer stator $S_1$ and an inner stator, $S_2$. The outer stator $S_1$ is constructed of a plurality of soft iron elements 1a, and a ring winding 4 and the inner stator $S_2$ is constructed of a plurality of soft iron elements 1b, and a ring winding 5. The soft iron elements 1a and 1b are horseshoe-shaped as shown in FIG. 1b. The free legs of the horseshoe-shaped elements 1a and 1b face the rotor R. As already discussed herein, the soft iron elements 1a of the outer stator and the soft iron elements 1b of the inner stator (looking with respect to a cross-section of the machine perpendicular to an axis thereof) are of equal width as shown by a double-arrow b.

Figure 2A:
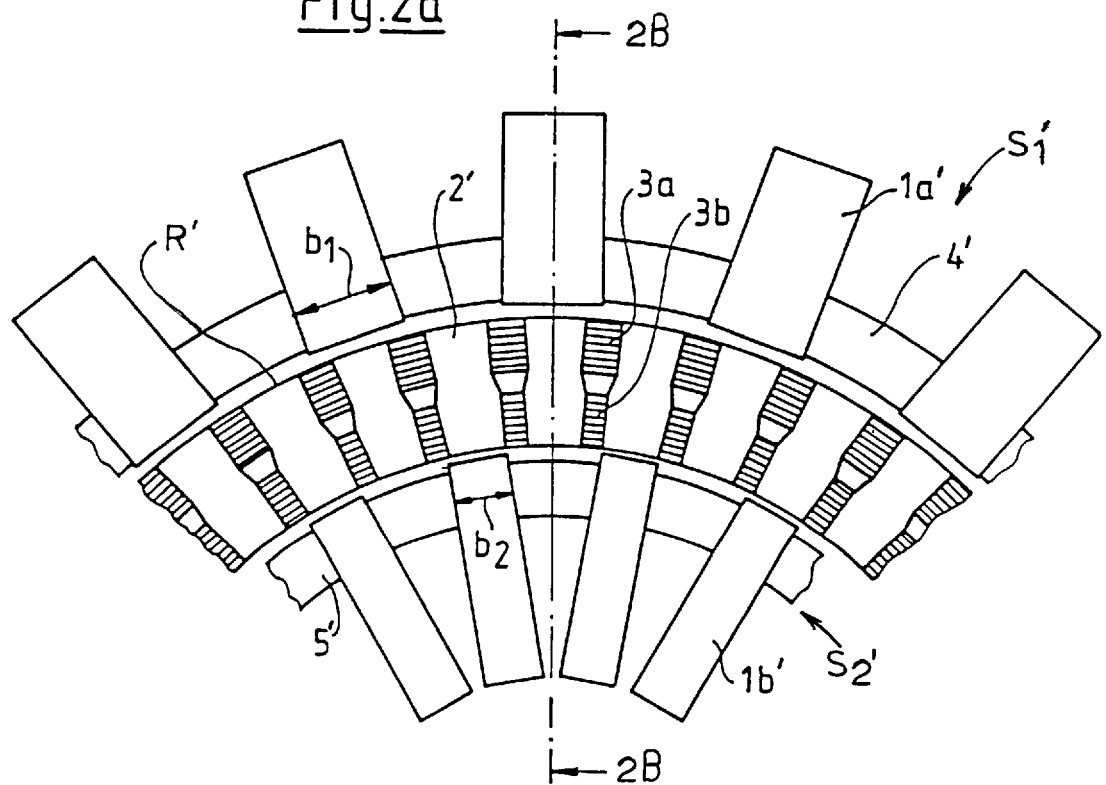
FIG. 2a is a sectional view of a portion of a transverse flux machine according to the invention, the section shown being perpendicular to an axis of the machine.
Figure 2B:
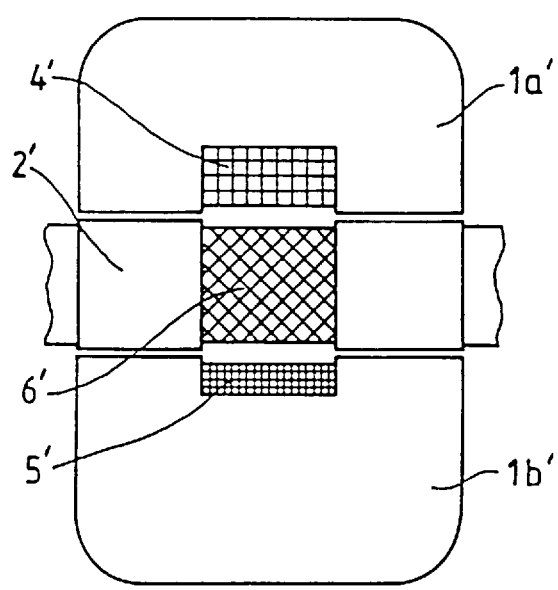

FIGS. 2a and 2b show a transverse flux machine according to the invention. The section of the machine shown in FIG. 2a is perpendicular to an axis of the machine. FIG. 2b is a cross-section through the object of FIG. 2a, in a cutting plane 2B—2B. The transverse flux machine shown in FIGS. 2a and 2b has a rotor R' with soft iron elements 2' and magnets 3a and 3b. The rotor R' is disposed between an outer stator $S_1'$, and an inner stator, $S_2'$ similar in design to the inner and outer stators described herein with respect to the prior art. The outer stator $S_1'$ is constructed of a plurality of soft iron elements 1a', and a ring winding 4' and the inner stator $S_2'$ is constructed of a plurality of soft iron elements 1b', and a ring winding 5'. The soft iron elements 1a' and 1b' are horse-shoe-shaped as shown in FIG. 2b. The free legs of the horseshoe-shaped elements 1a' and 1b' face the rotor R'. As also can be seen from FIG. 2b, the ring windings 4' and 5' are surrounded by respective horse-shoe-shaped stator soft iron elements 1a' and 1b'.

The rotatably mounted cylindrical rotor R' is disposed between the outer (1a') and inner (1b') soft iron stator elements. The rotor R' is built of two rings, each of which is composed of the plurality of magnets 3a and 3b as well as of the soft iron elements 2' neighboring the magnets 3a and 3b. Thus, there are always two magnets 3a, 3b between two neighboring soft iron elements 2'. The two rings of the rotor R', consisting of magnets and soft iron elements, are disposed next to one another in the axial direction. There is a plastic ring 6' between them, which is continuous, that is, extends over the entire periphery of the rotor R'.

As can be seen from FIG. 2a, the magnets 3a, 3b are narrowed from the outside toward the inside of the rotor R'. In other words, the width of the magnets within the rotor R' decreases in a direction toward the inner stator $S_2'$. Thus, with respect to the embodiment of the invention shown in FIGS. 2a and 2b, the radial outer magnets 3a have a larger size in the peripheral direction than the radial inner magnets 3b (this size in the peripheral direction is also called "magnet height"). Also, with respect to the embodiment of the invention shown in FIG. 2a, there is a connecting element in the radial direction between each set of two magnets 3a and 3b assigned to one another.

Furthermore, as can be seen from FIG. 2a, a width $b_2$ of the inner stator soft iron elements 1b' is smaller than a width $b_1$ of the outer stator soft iron elements 1a'. This width difference between the elements 1b' and the elements 1a' has the following favorable consequence: the radial inner stator $S_2'$ soft iron elements 1b' can be larger in the radial direction, that is, they can extend further inward radially than the elements 1b of the prior art before they bump into each other.

Preferably, the amount of narrowing of the rotor magnets corresponds to a ratio of the widths of the outer stator elements and the inner stator elements.

Also as a result of the narrowing of the magnets and the increased size of the elements 1b' in the radial direction, the space enclosed by the individual horseshoe-shaped elements 1b' is larger than the space enclosed by the horseshoe-shaped elements 1b of the prior art apparatus shown in FIGS. 1a and 1b. As mentioned above, this space contains the inner winding 5'. Thus, the inner winding 5' can be the same size as the outer winding 4'.

Figure 3A:
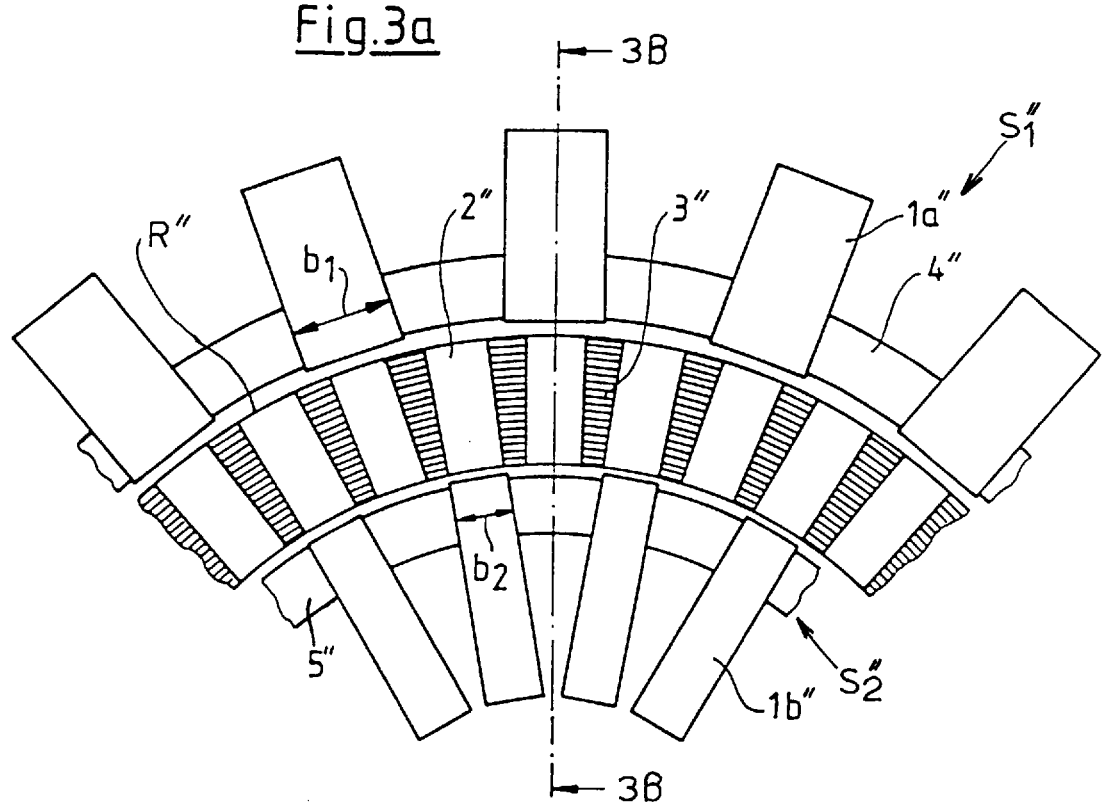
FIG. 3a is a sectional view of a portion of a second embodiment of a transverse flux machine according to the invention, the section shown being perpendicular to an axis of the machine.
Figure 3B:
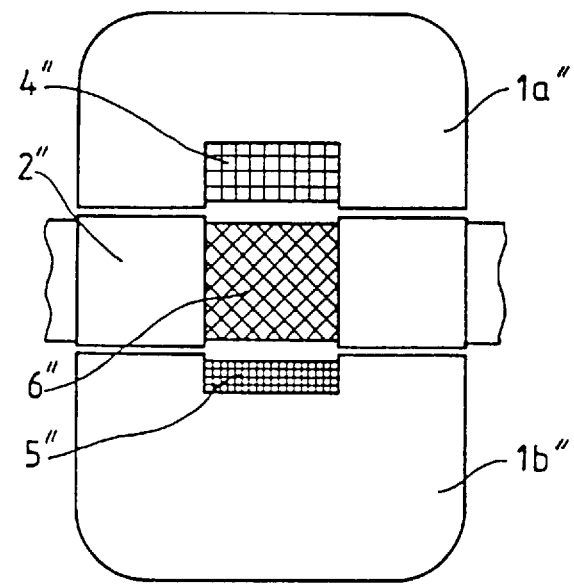

An alternative embodiment of a transverse flux machine according to the invention is shown in FIGS. 3a and 3b. The elements R", $S_1"$, $S_2"$, 1a", 1b", 2", 4", 5", and 6" are disposed in relation to each other and function in a manner similar to the elements R', $S_1'$, $S_2'$, 1a', 1b', 2', 4', 5', and 6', respectively, discussed herein with respect to FIGS. 2a and 2b. In the embodiment shown in FIGS. 3a and 3b, the magnets 3" narrow in a continuous manner and thus correspond in function to the magnets 3a and 3b shown in FIGS. 2a and 2b. The magnets 3" also narrow from the outside toward the inside of the rotor R" in a direction toward the stator $S_2"$. Thus, the magnets 3" have a trapezoidal shape. Accordingly, the magnets 3" are wedge-shaped in the representation shown in FIG. 3a. Here, the magnets 3" can be subdivided again, but connected to one another by some type of elements, whereby the separating gap—in the representation of FIG. 3a—can lie on a circular arc.

In the embodiment according to FIGS. 3a and 3b, the inner stator soft iron elements 1b" also have a width $b_2$ which is smaller than that of the width $b_1$ of the radial outer stator soft iron elements 1a".

The foregoing detailed description is given for clearness of understanding only, and no unnecessary limitations should be understood therefrom, as modifications within the scope of the invention will be apparent to those skilled in the art.

I claim:

1. A transverse flux machine comprising:
   (a) an outer stator having a plurality of soft iron outer stator elements and an outer ring winding;
   (b) an inner stator having a plurality of soft iron inner stator elements and an inner ring winding; and
   (c) a rotor having a plurality of soft iron rotor elements and a plurality of rotor magnets, said rotor elements alternating with said rotor magnets when viewed with respect to a plane perpendicular to an axis of the transverse flux machine, said rotor magnets, said inner stator elements, and said outer stator elements each having a width when viewed with respect to said plane, the width of the rotor magnets narrowing step-wise in a direction toward the inner stator to an extent such that a flux density in a radial inner air gap and a flux density in a radial outer air gap are substantially equalized, the width of the inner stator elements being smaller than the width of the outer stator elements.

2. The machine of claim 1 wherein the outer stator soft iron element has a width $b_1$, the inner stator soft iron element has a width $b_2$, and said step-wise narrowing of the rotor magnets is defined by a first width $w_1$ and a second width $w_2$, said second width $w_2$ being smaller than said first width $w_1$ and wherein $b_1/b_2 = w_1/w_2$.

* * * * *